Patented Apr. 18, 1944

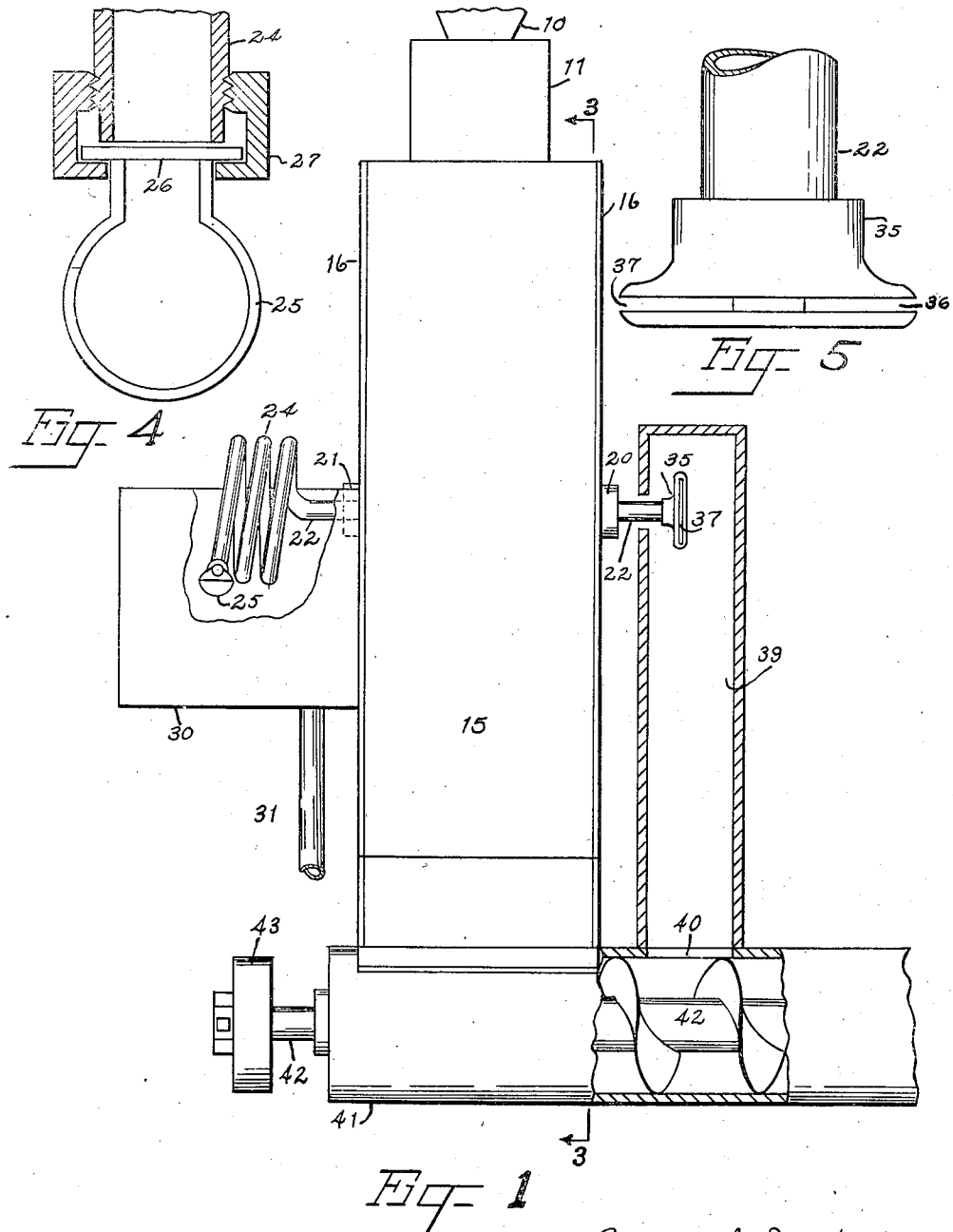

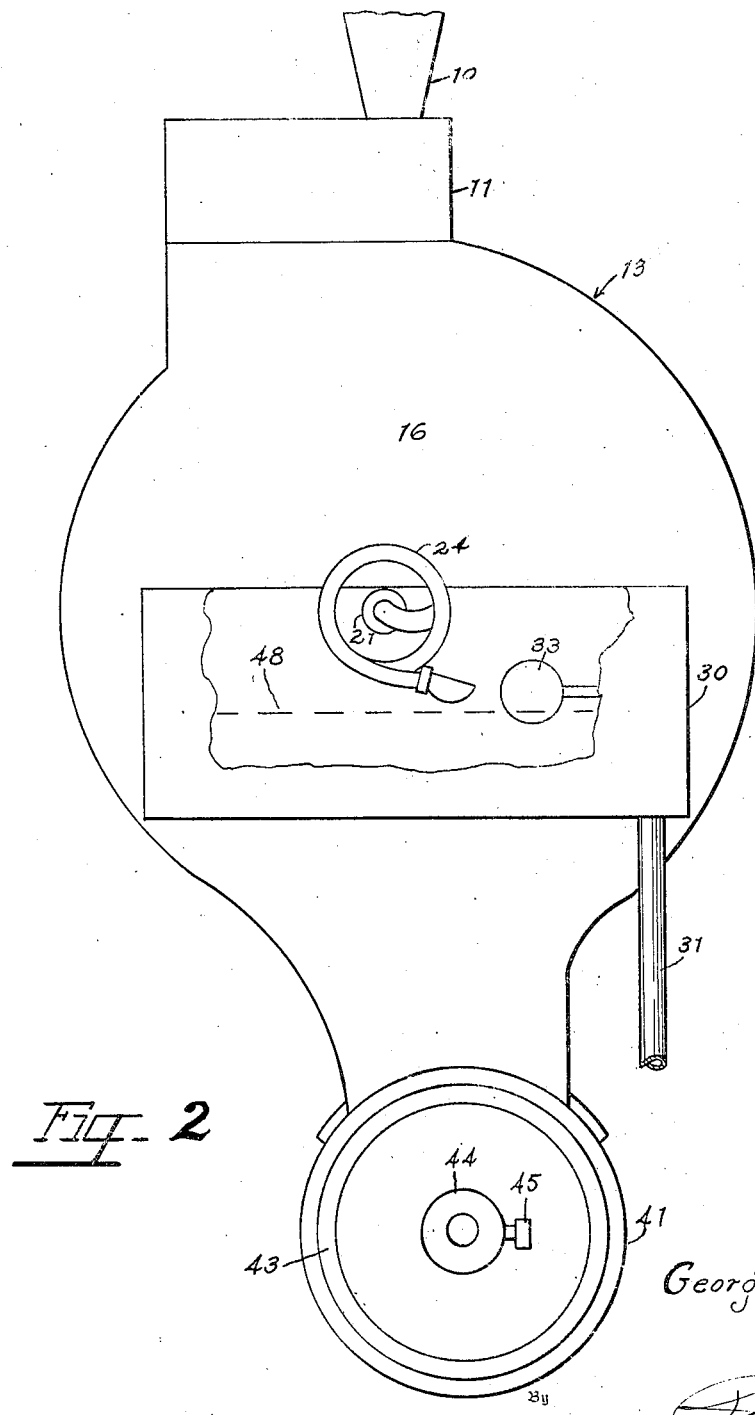

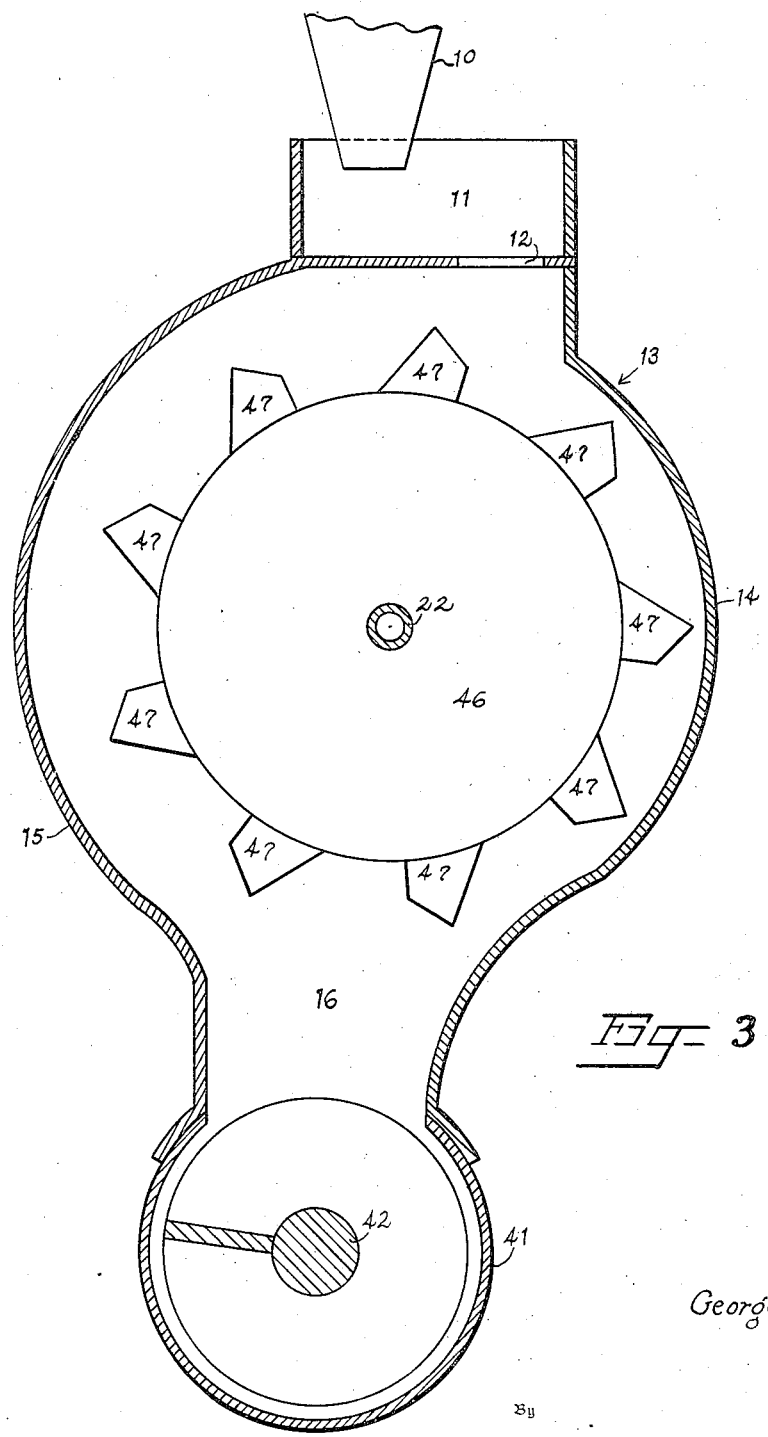

2,346,902

UNITED STATES PATENT OFFICE 2,346,902

MEANS FOR TREATING GRAIN

George A. Brotherton, Laurinburg, N. C.

Application July 19, 1943, Serial No. 495,315

4 Claims. (Cl. 83—27)

This invention relates to an apparatus for applying a definite amount of moisture such as water to wheat and other grain to temper the same prior to grinding.

Before wheat, rye, and other grains are ground, it is a prerequisite, in order to obtain best results, that the proper moisture content be present in the grain before it is ground. Various attempts have heretofore been made to apply moisture to grain, and then store the grain so that it will temper or undergo certain changes so that it will grind properly when it is desired to grind the same; however, none of these devices have given a controlled amount of moisture to the grain in proportion to the feed of the grain into a storage compartment.

It is an object of the present invention to provide apparatus through which grain is passed on its way from one storage bin to another, and to mix with the grain while it is in transit a predetermined amount of moisture which can be regulated to proportion the amount of moisture according to the amount of grain passing through the apparatus.

It is another object of this invention to provide an apparatus through which grain may be passed on its way to storage bins provided with means for dipping up a predetermined amount of water upon each revolution of a suitable wheel driven by the passage of grain, and adding this water to the grain as it moves onto the storage compartment.

Some of the objects of the invention having been stated, other objects will appear as the description proceeds, when taken in connection with the accompanying drawings, in which:

Figure 1 is an elevation with parts broken away showing the apparatus through which the grain is passed for applying moisture or water thereto;

Figure 2 is an elevation with parts broken away looking from the left-hand side of Figure 1;

Figure 3 is a vertical sectional view taken along the line 3—3 in Figure 1;

Figure 4 is a top plan view, with parts of the same in section, of the water scoop on the end of the coil;

Figure 5 is a top plan view of the spray head on the right-hand central portion of Figure 1, and made on an enlarged scale.

Referring more specifically to the drawings, the numeral 10 indicates a spout through which grain is delivered from a storage bin. The grain is delivered into a box 11 which has an opening 12 therein, which allows the grain to flow by gravity into a casing 13. The casing 13 has side walls 14 and 15 and end walls 16, only one of the end walls being shown, but the same are identical. Disposed in these end walls 16 are bearings 20 and 21 in which a pipe 22 is rotatably mounted. This pipe extends to the left in Figure 1, and has a coil 24 integral therewith, and on the open end of this coil a scoop or spoon 25 is adjustably mounted.

The spoon has an annular portion 26 which is encircled by a connector 27 which is threadably secured on the free end of coil 24. By adjusting the angularity of the spoon 25 with relation to its longitudinal axis and the longitudinal axis of the pipe 24 at its junction point with spoon 25, the amount of water picked up on each revolution of pipe 22 can be adjusted. The spoon 25 is adapted to pick up water from a container or tank 30 which has a pipe 31 leading thereinto and the flow of water is controlled into the tank 30 by means of conventional float mechanism 33.

The right-hand end of the pipe 22 in Figure 1 has a spray head 35 mounted thereon which has slots 36 and 37 therein through which the water may drip out of the pipe 22 into a chute 39 and through an opening 40 in a conveyer tube 41.

Rotatably mounted within the conveyer tube 41 is a screw conveyer 42 which is driven by any suitable means such as a pulley 43 driven from a belt leading from any suitable source of power. The pulley 43 has a hub portion 44 and a set screw 45 by means of which the pulley can be fixedly secured on the projecting end of screw conveyer shaft 42. The right-hand portion of the conveyer shaft leads to a storage bin, not shown, where the grain is deposited for aging after moisture has been applied thereto.

Fixedly mounted on the shaft 22 within the housing composed of end walls 16 and side walls 14 and 15, is a wheel 46 which has a plurality of cups 47 thereon. The grain entering the housing 13 through opening 12 falls into the cups 47 to the right of the dead center of the wheel 46 as shown in Figure 3, and this imparts a turning motion to the wheel 46, the rate of rotation of the wheel depending upon the speed at which the grain is allowed to pass through the opening 12. As the wheel 46 rotates, due to the weight of the grain filling the cups, the grain, when the cups approach lowermost position, spills out of the cups, and falls through the lower part of the housing 13 into the screw conveyer housing 41 where it is moved to the right in Figure 1 to the moistening spot where the moisture enters the opening 40 after falling down through chute 39. As the wheel 46 rotates, of course, the coil 24 rotates, and upon each revolution of the pipe 22, the scoop or spoon 25 will pick up a predetermined amount of water, the water in the tank 30 being indicated by dotted line 48. The water picked up by the spoon or scoop 25, as the pipe rotates, will follow around the coil 24 and feed into the horizontal section of pipe 22 which leads through the wheel 46, and when it reaches the right-hand end of the pipe, as seen in Figure 1, it will pass outwardly through the slots 36 and 37 in the fitting 35 on the end of pipe 32, and will fall downwardly through chute 39 into the grain disposed within the screw conveyer housing 41.

If the spoon or scoop is set at the full level or horizontal position, as shown in Figure 2, it will pick up the maximum amount of water; however, by loosening the nut 27 and axially rotating the scoop 25 to turn it sidewise, it will pick up a lesser amount of water depending upon how much the scoop is turned. After the scoop is turned to the desired position, the nut 27 is tightened, and the scoop is held in this adjusted position to deliver the required amount of water into the pipe 22 upon each revolution of the wheel 46.

The coil 24 prevents any back flow of the water picked up by the scoop and therefore all water which is picked up by the scoop and fed through the coil 24, is trapped in the horizontal portion of pipe 22 and will flow through the slots 36 and 37 in the fitting 35 on the right-hand end of the pipe in Figure 1.

In the drawings and specification, there has been set forth a preferred embodiment of the invention and although specific terms are employed, they are used in a generic and descriptive sense only and not for purposes of limitation, the scope of the invention being defined in the claims.

I claim:

1. Apparatus for applying treating liquid to grain comprising a casing having a pipe rotatably mounted therein, a wheel having cups on its periphery and fixedly secured on the pipe and being disposed within the casing, means for feeding grain into the upper end of the casing to strike the wheel and impart rotation to the wheel as the grain passes through the casing, a conveyer disposed below the casing and communicating therewith for conveying the grain laterally of the casing, an off-set scoop on one end of the pipe, a tank for holding liquid, the scoop as it rotates being adapted to enter the liquid and transfer liquid into the pipe, the other end of the pipe having perforations therein through which the liquid will flow and means for conducting the liquid from the perforation to the conveyer where the liquid is mixed with the grain as it passes through the conveyer.

2. Apparatus for applying treating liquid to grain comprising a casing having a pipe rotatably mounted therein, a wheel having cups on its periphery and fixedly secured on the pipe and being disposed within the casing, means for feeding grain into the upper end of the casing to strike the wheel and impart rotation to the wheels as the grain passes through the casing, a conveyer disposed below the casing and communicating therewith for conveying the grain laterally of the casing, an off-set scoop on one end of the pipe, a tank for holding liquid, the scoop as it rotates being adapted to enter the liquid and transfer a predetermined amount of liquid into the pipe, the other end of the pipe having a perforation therein through which the liquid will flow and means for conducting the liquid from the perforation to the conveyer where the liquid is mixed with the grain as it passes through the conveyer, said pipe having a coil disposed therein between the casing and the scoop for trapping liquid dipped up from the tank and forcing it to flow outwardly through the perforation.

3. Apparatus for applying treating liquid to grain comprising a casing having a pipe rotatably mounted therein, a wheel having cups on its periphery and fixedly secured on the pipe and being disposed within the casing, means for feeding grain into the upper end of the casing to strike the wheel and impart rotation to the wheel as the grain passes through the casing, a conveyer disposed below the casing and communicating therewith for conveying the grain laterally of the casing, an off-set scoop on one end of the pipe, a tank for holding liquid, the scoop as it rotates being adapted to enter the liquid and transfer liquid into the pipe, the other end of the pipe having a perforation therein through which the liquid will flow and means for conducting the liquid from the perforation to the conveyer where the liquid is mixed with the grain as it passes through the conveyer, said pipe having a coil disposed therein between the casing and the scoop for trapping liquid dipped up from the tank and forcing it to flow outwardly through the perforation, the scoop on the free end of the pipe being adjustable so as to regulate the amount of liquid picked up by the scoop from the tank upon each revolution of the pipe.

4. Apparatus for applying treating liquid to grain comprising a casing having a pipe rotatably mounted therein, a wheel having cups on its periphery and fixedly secured on the pipe and being disposed within the casing, means for feeding grain into the upper end of the casing to strike the wheel and impart rotation to the wheel as the grain passes through the casing, a conveyer disposed below the casing and communicating therewith for conveying the grain laterally of the casing, a scoop on one end of the pipe, a tank for holding liquid, the scoop as it rotates being adapted to enter the liquid and transfer liquid into the pipe, the other end of the pipe having perforations therein through which the liquid will flow and means for conducting the liquid from the perforation to the conveyer where the liquid is mixed with the grain as it passes through the conveyer.

GEORGE A. BROTHERTON.